United States Patent

[11] 3,593,260

| [72] | Inventor | Milo E. Stormo<br>16352 Barneston St., Granada Hills, Calif. 91344 |
|---|---|---|
| [21] | Appl. No. | 744,397 |
| [22] | Filed | July 12, 1968 |
| [45] | Patented | July 13, 1971 |
| [73] | Assignee | Singer-General Precision, Inc. |

[54] FLIGHT PATH DISPLAY
3 Claims, 3 Drawing Figs.

| [52] | U.S. Cl. | 340/27 NA |
|---|---|---|
| [51] | Int. Cl. | G08g 5/02 |
| [50] | Field of Search | 340/27 NA; 356/251, 252 |

[56] References Cited
UNITED STATES PATENTS

| 2,974,875 | 3/1961 | Brown, Jr. | 356/251 |
| 3,005,185 | 10/1961 | Cumming et al. | 340/27 |
| 3,024,536 | 3/1962 | Kuhlenkamp | 356/252 |

*Primary Examiner*—Kathleen H. Claffy
*Assistant Examiner*—Jan S. Black
*Attorney*—Joseph R. Dwyer ABSTRACT: An electrooptical aircraft flight instrument that accepts angle of attack input signals and displays upon a transparent screen in the pilot's normal line of sight and focused at infinity, the actual flight path of the aircraft through the air mass.

PATENTED JUL 13 1971 3,593,260

INVENTOR:
MILO E. STORMO
BY Joseph R. Dwyer
ATTORNEY

FLIGHT PATH DISPLAY

BACKGROUND OF THE INVENTION

The invention relates to aircraft flight instruments, and particularly to an optical display instrument that projects into the pilot's line of sight an illuminated mark representing the flight path of the aircraft. During descent of the aircraft, this flight path mark appears to be projected directly on the ground and shows the pilot the aircraft impact point, or precise point of touchdown on the airport runway.

There are many types of instruments to aid the pilot in making approaches and landings during periods when the airport is below visual flight rule (VFR) conditions. However, when the weather is clear and under visual flight rules, the pilot is without external assitance and must rely solely upon his own judgement in planning his landing approach. While this presents no serious problems to the pilots of the smaller propeller driven aircraft, it does present some serious concern to crews of larger aircraft which, with landing gear, flaps and speed brakes extended, cannot readily accelerate to stretch the glide to the runway when the aircraft approach falls short of its intended flight path. In order to overcome this difficulty it is the usual procedure to plan the touchdown point for the end of the runway. This, of course, is acceptable procedure only if there is adequate runway length. This invention assists the pilot in planning an accurate VFR approach by projecting into his line of sight, and against a background of the airport runway, an illuminated mark showing the point upon the runway at which the aircraft will touch down.

SUMMARY OF THE INVENTION

The flight path of any aircraft is directly into the relative wind. The angle between relative wind and the longitudinal axis of the aircraft, or more particularly the chord of the wing, is the angle of attack. There are many types of commercially available sensors that measure aircraft angle of attack. The instrument described herein uses angle of attack information from a sensor to servo a reticle which is optically projected at infinity onto a transparent screen in the pilot's line of sight, and into "real world" coordinates so that the projection shows the pilot his impending impact point on the ground.

DESCRIPTION OF THE DRAWINGS

In the drawings which illustrate a preferred embodiment of the invention.

DETAILED DESCRIPTION

Figure 1:
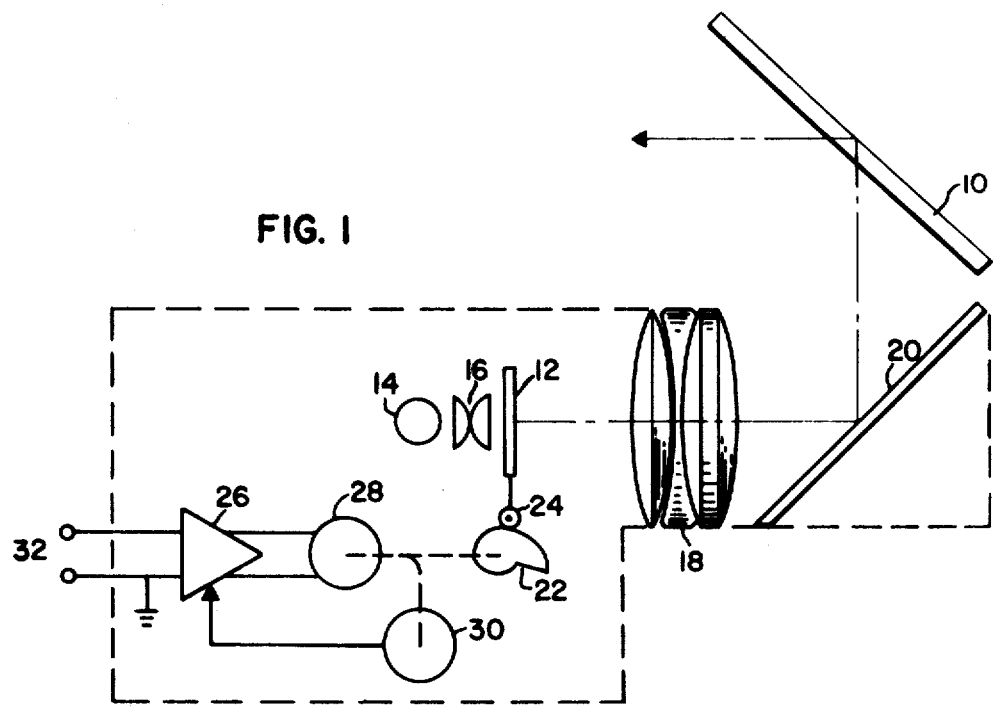
FIG. 1 is a schematic diagram of the flight path display instrument.

The flight path display instrument, as shown in FIG. 1, comprises a combining glass 10 which is transparent but which is coated with a thin optical coating upon which a light image may be projected to be combined with objects viewed through the glass. In the flight path display instrument, combining glass 10 receives the projected image of a reticle which is photographically printed on reticle carrier 12 within the housing of the instrument. Reticle carrier 12 may be an opaque film with the reticle in the form of a transparent line or cross-hair. This transparent reticle is illuminated by a lamp 14 which projects white or suitably colored light through condensing lenses 16 onto the surface of the reticle carrier 12. A collimator lens assembly 18 projects the illuminated reticle against the combining glass 10 via a mirror 20 which is positioned at an angle 45° to the optical axis of the lens assembly 18, and which is parallel to the combining glass 10.

Collimating lens assembly 18 may have an overall diameter of approximately 3 inches and a focal length of approximately 4 inches. The assembly is accurately spaced from the reticle carrier 12 so that the reticle is always in the focal plane of the lens assembly 18. By thus positioning the reticle in the focal plane of the lens assembly, the image of the reticle appearing on combining glass 10 will be focused at infinity to an observer. Thus, an observer may be viewing objects at infinity through the combining glass 10 and may observe the reticle image, also appearing to be infinity, to be superimposed with the objects being viewed.

As previously mentioned, the reticle may be a transparent line or cross-hair on the surface of an opaque reticle carrier 12. In the flight path display instrument, the reticle carrier 12 is moved so that the reticle image projected on combining glass 10 appears to move vertically. Thus, if the reticle is a horizontal line on reticle carrier 12, the image will appear as a horizontal line on combining glass 10 that is moved up and down in a vertical direction according to the movement of the reticle carrier 12. As shown in FIG. 1, the reticle carrier 12 may be vertically moved through the use of a cam follower 24 which engages a cam 22. Cam 22 is rotated by a servo motor 28 excited by a servo amplifier 26. Motor 28 will rotate cam 22 and also a generator 30 which provides a feedback error signal into amplifier 26. The input terminals 32 of amplifier 26 are connected to an angle of attack sensor which supplies output signals that are proportional to the angle of attack of the aircraft. Angle of attack sensors are commercially available through such manufacturers as Lear-Siegler, and the angle of attack sensor forms no part of this invention.

OPERATION

Figure 2:
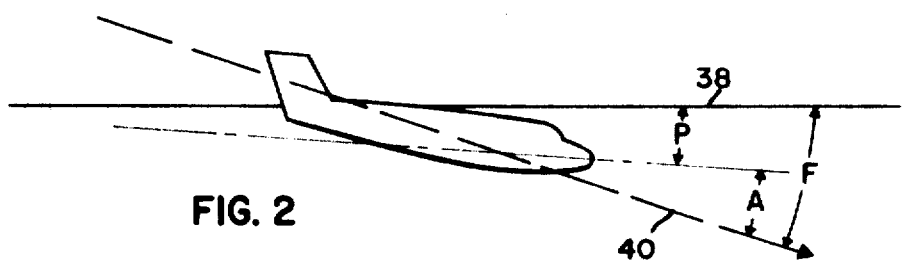
FIG. 2 is a diagram showing aircraft pitch, glide path, and angle of attack.

FIG. 2, which is presented to assist in the understanding of the operation of the invention, shows an aircraft during descent. The longitudinal axis of the aircraft is at a negative pitch angle, P, to the horizon 38 and since the aircraft is in slow flight the angle of attack, A, is relatively large. Accordingly, the flight path angle, F, which is equal to A—P, is quite large showing a steep approach to a landing.

The flight path vector 40 being followed by the aircraft will point to the landing spot on the aircraft runway if the aircraft pitch angle, P, and airspeed remain constant. It is this landing spot which the flight path display instrument is to identify for the pilot. Since the aircraft is flying down the flight path vector 40, the landing spot can be located by the measurement of angle of attack, A. There are several commercially available types of sensors that are designed to produce electrical signals that are proportional to the angle of attack of the aircraft.

Figure 3:
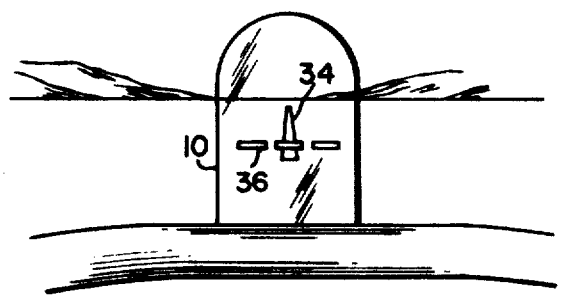
FIG. 3 is an illustration showing, in perspective, how the flight path display instrument may appear during an aircraft approach to landing.

As the angle of attack sensor supplies voltages to the servo motor and adjusts the height of the reticle carrier 12, the image of the reticle is projected upon the combining mirror 10, as shown in FIG. 3.

FIG. 3 is an illustration, in perspective, of what might be expected to be observed by the pilot of an aircraft approaching a runway at a distance of perhaps 8 miles. The angle of attack sensor senses the angle, A, as shown in FIG. 2, generates a signal which is applied to the servosystem that drives the reticle carrier 12, and the image of the reticle 36 is projected on the combining mirror 10 to display to the pilot the point of touchdown of the aircraft upon runway 34.

The reticle on reticle carrier 12 may be a small cross or may be a dashed line, as is illustrated in FIG. 3. With such reticles the effects of crosswinds may be observed by noting the drift of the runway 34 across the reticle image 36. By maintaining the reticle image 36 at a constant point upon the runway 34, the pilot may easily compensate for crosswinds as well as for various headwinds or tailwinds that will affect his landing. If the reticle image 36 appears to move along the runway in a direction of the aircraft flight, the pilot may either lower his pitch angle, P, as shown in FIG. 2, or may apply more flaps or speed brakes to increase the angle of attack, A, as shown in FIG. 2. Similarly, if the reticle image 36 appears to be moving toward the landing threshold of the runway 36, the pilot may make appropriate adjustments of the aircraft so that the reticle image 36 appears to remain stationary at the desired impact point on runway 34. It can therefore be appreciated that the pilot can easily plan an accurate landing approach as soon as he is able to see the airport. Since the reticle image 36 displayed upon the runway 34 is focused at infinity, the pilot will view the airport runway and also the reticle image without the necessity of refocusing his eyes or the necessity of removing his eyes form the landing pattern where local air traffic may present safety hazards.

I claim:

1. An aircraft flight path optical display system for projecting into the line of sight of the pilot an illuminated mark representing the flight path of the aircraft, said system comprising: a partially reflective combining glass positioned in the line of sight of the pilot; a vertically movable reticle carrier having a reticle of a particular configuration formed thereon; optical means including a lens assembly spaced from said carrier a predetermined distance such that such reticle is positioned in the focal plane of said lens assembly, said optical means projecting an image of said reticle onto said combining glass to be focused at infinity so that the pilot may observe the terrain position of touchdown of the aircraft with said reticle image superimposed thereon; cam means engaging said reticle carrier for rectilinearly moving said carrier and said reticle along a vertical path; servo means coupled to said cam means for driving said cam means; and circuit means introducing drive signals to said servo means from an angle-of-attack sensor representative of the angle-of-attack of said aircraft.

2. The display system defined in claim 1, in which said reticle is photographically printed on said carrier in the form of a horizontal transparent line extending across an opaque film.

3. The system defined in claim 1, in which said optical means includes a light source for illuminating said reticle.